(12) United States Patent
Gabriel et al.

(10) Patent No.: US 8,082,563 B2
(45) Date of Patent: Dec. 20, 2011

(54) SYSTEM AND METHOD FOR CONTENT ACCESS CONTROL THROUGH DEFAULT PROFILES AND METADATA POINTERS

(75) Inventors: Michael Gabriel, Greenwich, CT (US); Bruce Probst, Croton-On-Hudson, NY (US); Jeffrey DiBartolomeo, Merrick, NY (US)

(73) Assignee: Home Box Office, Inc., New York, NY (US)

(*) Notice: Subject to any disclaimer, the term of this patent is extended or adjusted under 35 U.S.C. 154(b) by 1592 days.

(21) Appl. No.: 10/627,002

(22) Filed: Jul. 25, 2003

(65) Prior Publication Data

US 2005/0022229 A1    Jan. 27, 2005

(51) Int. Cl.
*H04N 7/16* (2011.01)
*G06F 7/04* (2006.01)
*G06F 21/00* (2006.01)
*G06Q 20/00* (2006.01)

(52) U.S. Cl. ............... 725/28; 726/21; 726/27; 726/30; 713/182; 713/183; 705/67

(58) Field of Classification Search .............. 725/25, 725/26–30, 112; 726/21, 27, 30; 713/182, 713/183; 705/67
See application file for complete search history.

(56) References Cited

U.S. PATENT DOCUMENTS

| | | | |
|---|---|---|---|
| 4,930,158 A | 5/1990 | Vogel | |
| 5,629,980 A | 5/1997 | Stefik et al. | |
| 5,634,012 A | 5/1997 | Stefik et al. | |
| 5,638,443 A | 6/1997 | Stefik et al. | |
| 5,724,472 A | 3/1998 | Abecassis | |
| 5,828,402 A | 10/1998 | Collings | |
| 5,848,418 A | 12/1998 | de Souza et al. | |
| 5,974,503 A | 10/1999 | Venkatesh et al. | |
| 6,009,433 A | 12/1999 | Kurano et al. | |
| 6,072,520 A | 6/2000 | Yuen et al. | |
| 6,104,334 A | 8/2000 | Allport | |
| 6,104,423 A | 8/2000 | Elam | |

(Continued)

FOREIGN PATENT DOCUMENTS

CA      2 348 284      11/2001

OTHER PUBLICATIONS

Ozer et al., "Tracking Viewing Behavior of Advertisments on a Home Entertainmnet System", U.S. Appl. No. 09/376,631, filled Sep. 18, 1999.*

(Continued)

*Primary Examiner* — Hoang-Vu A Nguyen-Ba
(74) *Attorney, Agent, or Firm* — Kenyon & Kenyon LLP

(57) ABSTRACT

The control of access to content via a player system accessible by a plurality of users is described. A default profile is provided including filtering criteria, the filtering criteria describing at least one of characteristic of content permitted for all of the plurality of users and a characteristic of content prohibited for all of the plurality of users. Metadata associated with a selected content and the filtering criteria are compared, and access to the content is permitted or denied based on the comparison. Also, content is selected, the selected content having metadata linked thereto via a pointer. The metadata is obtained using the pointer. The metadata and filtering criteria are compared, the filtering criteria describing characteristics of at least one of permitted or prohibited content. Access to the content is permitted or denied based on the comparison.

37 Claims, 4 Drawing Sheets

U.S. PATENT DOCUMENTS

| | | | |
|---|---|---|---|
| 6,151,444 A | | 11/2000 | Abecassis |
| 6,163,272 A | * | 12/2000 | Goode et al. ............... 725/30 |
| 6,163,316 A | | 12/2000 | Killian |
| 6,212,679 B1 | | 4/2001 | Vornsand |
| 6,216,263 B1 | | 4/2001 | Elam |
| 6,223,292 B1 | | 4/2001 | Dean et al. |
| 6,292,569 B1 | | 9/2001 | Shear et al. |
| 6,321,381 B1 | | 11/2001 | Yuen et al. |
| 6,351,596 B1 | | 2/2002 | Ostrover |
| 6,363,488 B1 | | 3/2002 | Ginter et al. |
| 6,385,596 B1 | | 5/2002 | Wiser et al. |
| 6,398,245 B1 | | 6/2002 | Gruse et al. |
| 6,400,407 B1 | | 6/2002 | Zigmond et al. |
| 6,401,094 B1 | | 6/2002 | Stemp et al. |
| 6,704,929 B1 | * | 3/2004 | Ozer et al. ............... 725/13 |
| 6,708,335 B1 | * | 3/2004 | Ozer et al. ............... 725/20 |
| 6,754,642 B2 | | 6/2004 | Tadayon et al. |
| 6,760,915 B2 | * | 7/2004 | deCarmo ............... 725/28 |
| 6,785,901 B1 | * | 8/2004 | Horiwitz et al. ............... 725/25 |
| 6,925,246 B1 | * | 8/2005 | Behl ............... 386/46 |
| 7,657,267 B2 | * | 2/2010 | Kitazato ............... 455/456.3 |
| 2001/0021926 A1 | | 9/2001 | Schneck et al. |
| 2002/0013941 A1 | | 1/2002 | Ward, III et al. |
| 2002/0013948 A1 | | 1/2002 | Aguayo et al. |
| 2002/0049806 A1 | | 4/2002 | Gatz et al. |
| 2002/0059094 A1 | | 5/2002 | Hosea et al. |
| 2002/0073421 A1 | | 6/2002 | Levitan et al. |
| 2003/0014750 A1 | * | 1/2003 | Kamen ............... 725/25 |
| 2003/0014751 A1 | * | 1/2003 | Paek ............... 725/30 |
| 2003/0088420 A1 | * | 5/2003 | alSafadi et al. ............... 704/270.1 |
| 2003/0135857 A1 | * | 7/2003 | Pendakur et al. ............... 725/61 |

OTHER PUBLICATIONS

Daly, R. (Apr. 1997) *META tags and Metadata*, retrieved from www.netpreneur.org/connect/wm/meta.html.

Etzioni, A. et al. (May 1997), *Controlling Television: Parental Filters*, The Communitarian Network, retrieved Jun. 10, 2002 from www.gwu.edu/~ccps/tv.html.

*Information Technology—Digital Compression and Coding of Continuous-Tone Still Images—Requirements and Guidelines*, CCITT Recommendation T.81(Sep. 1992).

Internal Report of Jul. 2002.

Joyce, E. (Jun. 22, 2002) Gemstar Vows to Fight Patent Ruling, retrieved Jun. 24, 2002 from www.atnewyork.com/news/article.php/1369951.

About MPA, MPAA; retrieved Aug. 2, 2002 from http://www.mpaa.org/about/content.htm.

Macavinta, C. (Mar. 13, 1998) FCC Approves PC-TV V-Chips; retrieved Jul. 8, 2002 from http://new.com./2100-1023-209031.html.

Questions & Answers: Everything You Always Wanted to Know About the Movie Rating System; Retrieved Jul. 3, 2002 from http://www.filmratings.com/questions.htm.

Rating System (n.d.) Retrieved Aug 2, 2002 from http://www.filmadvisoryboard.org/RatingSystem.asp.

Sylvester, S. (Aug. 23, 1999) MPAA Ratings System Gets 'F' From Critics, filmmakers; retrieved Aug. 2, 2002 from www.cnn.com/SHOWBIZ/Movies/9908/23/mpaa.ratings/.

Study: Media Ratings Systems Need Overhaul (Jun. 4, 2001); Retrieved Aug. 29, 2002 from http://www.cnn.com/2001/SHOWBIZ/News/06/04/movie.studies.

Weinberg, J. (1997) 19 Hastings Comm/Ent L.J. 453; retrieved Jul. 8, 2002 from http://www.law.wayne.edu/weinberg/rating.htm.

Daly, R. (Apr. 1997) *META tags and Metadata*, retrieved from www.netpreneur.org/connect/wm/meta.html.

Etzioni, A. et al. (May 1997), *Controlling Television: Parental Filters*, The Communitarian Network, retrieved Jun. 10, 2002 from www.gwu.edu/~ccps/tv.html.

*Information Technology—Digital Compression and Coding of Continuous-Tone Still Images—Requirements and Guidelines*, CCITT Recommendation T.81(Sep. 1992).

Internal Report of Jul. 2002.

Joyce, E. (Jun. 22, 2002) Gemstar Vows to Fight Patent Ruling, retrieved Jun. 24, 2002 from www.atnewyork.com/news/article.php/1369951.

Weinberg, J. (1997) 19 Hastings Comm/Ent L.J. 453; retrieved Jul. 26, 2006 from http://www.law.wayne.edu/weinberg/rating.htm, pp. 1-24.

Rating System. Retrieved Jul. 26, 2006 from http://www.filmadvisoryboard.org/ratings/Default.asp, pp. 1-3.

Supplementary European Search Report dated May 8, 2009 issued in corresponding European Patent Application No. 04 77 9055.

* cited by examiner

FIG. 1

```
┌─────────────────────────────────────────────────────────────┐
│ □              User Profile for Jamie                    ☰  │
│                                                              │
│   ┌─────────────────────────┐  ┌──────────────────────────┐ │
│   │  Acceptable MPAA Ratings│  │  Acceptable TV Ratings   │ │
│   │                          │  │                          │ │
│   │   ☑ G       ☑ R         │  │  ☑ TV-Y     ☑ TV-PG     │ │
│   │   ☑ PG      ☐ NC-17     │  │  ☑ TV-Y7    ☐ TV-14     │ │
│   │   ☑ PG-13   ☐ X         │  │  ☑ TV-G     ☐ TV-MA     │ │
│   └─────────────────────────┘  └──────────────────────────┘ │
│                                                              │
│   ┌────────────────────────────────────────────────────────┐│
│   │            Acceptable Content Advisories               ││
│   │   ☑ Moderate Violence        ☑ Coarse Language         ││
│   │   ☐ Intense Violence         ☑ Strong Coarse Language  ││
│   │   ☐ Graphic Violence         ☐ Crude Indecent Language ││
│   │   ☐ Mild Sexual Situations   ☑ Suggestive Dialogue     ││
│   │   ☐ Intense Sexual Situations ☐ Very Suggestive Dialogue││
│   │   ☐ Explicit Sexual Activity                           ││
│   └────────────────────────────────────────────────────────┘│
│                                                              │
│   ┌────────────────────────────────────────────────────────┐│
│   │       Block Content That Matches The Following Criteria││
│   │                                                        ││
│   │ Synopsis Contains: [rapper, drug, sexy, prostitute, ghetto, mafia]││
│   │ Director Is:       [john smith, mary joley]            ││
│   │ Featured Actors:   [bob badman, betty speakeasy, thug rappa]││
│   │ Genre Is:          [horror]                            ││
│   │                                                        ││
│   │                                            ( Save )    ││
│   └────────────────────────────────────────────────────────┘│
└─────────────────────────────────────────────────────────────┘
```

_US 8,082,563 B2_

SYSTEM AND METHOD FOR CONTENT ACCESS CONTROL THROUGH DEFAULT PROFILES AND METADATA POINTERS

FIELD OF THE INVENTION

The present invention relates to control of access to content (e.g., audio data and/or video data).

BACKGROUND OF THE INVENTION

Content-provision systems, such cable TV, satellite TV, video-on-demand (VOD), pay-per-view (PPV), and/or Web-based systems offer an enormous selection of video programs containing various types of substantive content, some of which may not be suitable for certain users, such as a child viewer.

SUMMARY

To prevent inappropriate or undesirable programs from being viewed, "parental controls" may, for example, act to "filter" the content received from the content provider. Parental controls may block content (e.g., audio and/or video data) based on a variety of content characteristics. For example, parental controls may block content, such as video and/or audio programs, encoded with particular ratings information, such as R and X under the MPAA (Motion Picture Association of America) ratings system. Or, for example, the parental controls may block content encoded with particular content indicators, such as "adult language," "violence," and "nudity." Or, for example, the parental controls may block content based on a particular channel and/or from a particular source.

However, various users, for example, viewers of content may share a content player system, such as a computer or a television with a set top box. Each of these viewers may have various different tastes and sensitivities with respect to subject matter of video programs.

Parental controls may allow separate filtering criteria to be defined for each viewer (e.g., one for children, one for teenagers, and one for adults). Each viewer's filtering criteria may be activated upon entering an identifier associated with that user and/or with that user's criteria. Thus, for example, if a user enters an identifier associated with criteria for children's programs, only programs suitable for a child are available for viewing. Similarly, if the user enters an identifier associated with criteria defined by that adult, only programs desired by that adult are available for viewing.

It is believed, however, that such "multiple-viewer" filtering criteria may be disadvantageous in that only one filtering criteria is active at one time (e.g., the filtering criteria for a child terminates upon entry of an identifier associated with an adult's filtering criteria). Upon termination of the adult's viewing session, the child's identifier must be re-entered to activate the appropriate filtering criteria. Failure to re-activate such filtering may allow the child to access inappropriate content. Furthermore, requiring an identifier to be entered each time a child or other viewer wishes to view video programs may be inconvenient and impractical, for example, if other guardians, such as babysitters, are present.

According to an example embodiment of the present invention, controlled access to content is provided. A default profile (e.g., a family profile) is provided which includes at least one filtering criterion (e.g., censorship criterion), the filtering criterion describing at least one of characteristics of content permitted for all of the plurality of users and characteristics of content prohibited for all of the plurality of users. Metadata associated with a selected content and the filtering criterion of the default profile are compared. The metadata includes information related to the selected content. Access to (including, e.g., rendering of) the content is permitted or denied based on the comparison.

A content player is also provided. The player may include, for example, a memory device storing a default profile, the default profile including at least one filtering criterion, the filtering criterion of the default profile describing at least one of characteristics of content permitted for all of the plurality of users and characteristics of content prohibited for all of the plurality of users. The player may include a processor configured to compare metadata associated with selected content and the filtering criteria of the default profile, the processor configured to permit or deny rendering of the selected content based on the comparison.

In another example embodiment according to the present invention, a method to control access to content is provided which includes selecting content, the selected content having metadata linked thereto via a pointer. The metadata is obtained using the pointer. The metadata and at least one filtering criterion are compared, the filtering criterion describing characteristics of at least one of permitted content or prohibited content. Access to the selected content is permitted or denied based on the comparison. The pointer may be embedded, for example, in a Vertical Blanking Interval (VBI) of a signal of the selected content. The pointer may be a URL, and the metadata may be obtained over the Internet using the URL.

In another example embodiment, a content player accessible to a plurality of users is described. The player may include, for example, a memory device storing at least one filtering criterion, the filtering criterion describing characteristics of at least one of permitted content and prohibited content. The player may also include a processor configured to obtain a pointer to metadata associated with selected content, obtain the metadata using the pointer, compare the metadata to the filtering criteria, and to permit or deny rendering of the selected content based on the comparison.

BRIEF DESCRIPTION OF THE DRAWINGS

FIG. 1 illustrates an exemplary Account Manager Screen according to the present invention.

DETAILED DESCRIPTION

Figure 2:
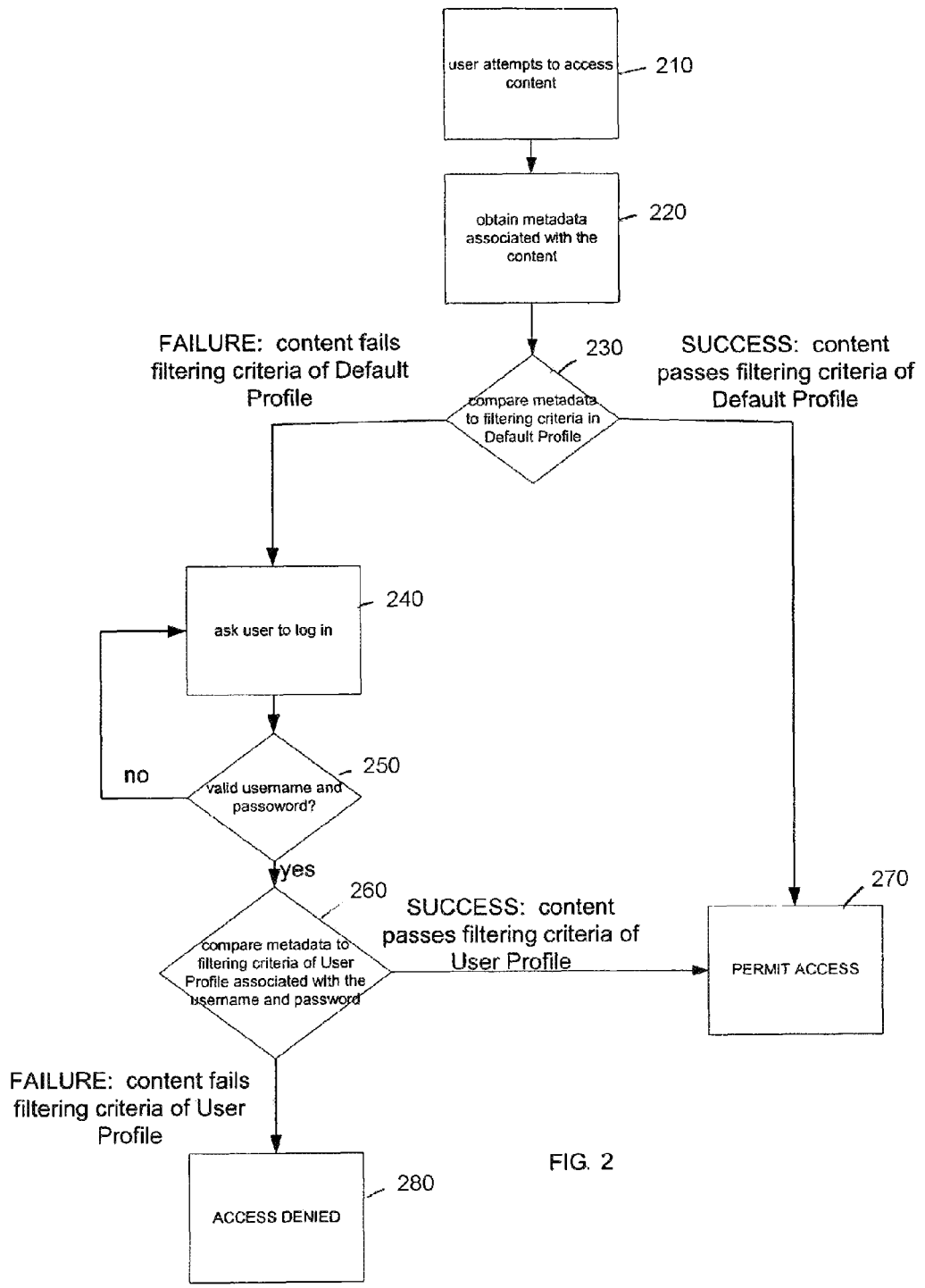
FIG. 2 is a block diagram showing an operational sequence for comparing content and profiles according to the present invention.

Profiles: In accordance with example embodiments of the present invention, access to content (e.g., audio and/or video data or programs) is controlled through the use of a profile system. In one embodiment, profiles are created for users of a content player system. Each of the profiles may describe content that us acceptable (e.g., permitted) to be played (e.g., rendered/displayed) to a group of users or individual users.

Default Profile: In one example embodiment, a default profile (e.g., a "family" profile) may be provided which describes or defines filtering (e.g., censorship) criteria for determining which content may be made available to all users of a content player system. The default profile may describe, for example, content (e.g., video programs) or characteristics of content which are acceptable or "safe" for all users of the system (e.g., all members of a family). Content that meets the criteria may be played by any users of the system without requiring the user to login. For example, the default profile may permit access to all content having a specific rating, for example, "G" or "PG". In the example embodiment, the Default Profile is "active" without requiring a user to provide user information (e.g., without requiring a user to log in to the system or provide identification information).

User Profiles: In the example embodiment, individual user profiles may be provided which defines filtering criteria for determining which content may be made available to particular users of the system. By creating separate user profiles, specific users of the system may be granted access to content other than that described in the default profile. For example, if the default profile permits all users of the system to access G rated profiles, a user profile for a user such as a teenager may permit access to content with an "R" rating. Another user profile may be provided for a parent which permits access to all content. Activation of one of these individual user profiles may require a user to login with a userid and/or password or provide other identification information.

Filtering criteria: The filtering criteria defined in the default and user profiles may contain an aggregate of various filtering criteria. The filtering criteria may include rules which describe content permitted to be played or content which should not be permitted to be played back based on ratings information, actors, directors, program type or genre, channel/source, synopsis, keywords, etc.:

Ratings: "Allow programs with ratings of G, PG, PG-13;" "Prohibit programs with rating of X"

Actors: "Prohibit programs featuring these specific actors . . . "

Director: "Prohibit programs by these specific directors . . . "

Program Type: "Prohibit programs classified as 'horror'"

Channel/source: "Prohibit programs from the following channels . . . ;" "Prohibit programs from the following Web sites . . . "

Synopsis: "Prohibit programs dealing with the mafia or drug dealers."

The filtering criteria may be flexible, allowing specific combinations of criteria:

Content Advisories override MPAA Rating:
"Even though the user is permitted to view R-rated programs, prohibit programs having explicit sexual scenes or nudity."

Program Type overrides Synopsis:
"Prohibit programs whose synopsis mentions 'prisons' except for programs that are classified as 'Documentary.'"

In one embodiment, the filtering criteria is not specific to a particular content (program), although in another embodiment, filtering criteria may be provided in which specific content is prohibited (or permitted).

Account Manager: In accordance with an example embodiment of the present invention, an Account Manager system may be provided to create and modify the Default Profile and the User Profiles. In this embodiment, only authorized users may create/modify profiles. For example, before being permitted to create or modify any of the profile, a user may be required to log into the Account Manager system with a userid and/or password.

After logging into the system, the user may create and/or modify profiles using, for example, a graphical user interface. FIG. 1 shows one example of a screen for configuring a profile. Here, the user may select appropriate filtering criteria for a particular User Profile (in this case for user "Jamie" or for the Default Profile. For example, the user may select acceptable MPAA and TV ratings by selecting (via an input device such as a mouse, keyboard, keypad, etc.) the appropriate check box. Also, the user may select acceptable content advisories, and may input blocking criteria. A username and password may be associated with each of the individual User Profiles.

The Account Manager system may also allow an authorized user to change various system settings. For example, the content player system may be set to default to the Default Profile. After a User Profile is activated (e.g., by a user logging in), the system may automatically revert back to the Default Profile after a program is viewed.

Content: The content may be transmitted or provided to users by any means. For example, the content may be transmitted to the users via a cable television network, a satellite network, a video-on-demand network, a pay-per-view network, and a web-based network, broadcast, multicast, and point cast. The content may also be provided to users on removable media such as CDs, DVDs, tapes, EEPROM, etc.

Metadata: In accordance with an example embodiment of the present invention, metadata is associated with content to describe the subject matter of the content, or describe information associated with the content. For example, each program may have a metadata file associated therewith (Program Metadata File, "PMF"), which contains information about the program. The PMF may be in an XML format to allow for easy expansion for evolving control criteria, but other formats are possible. The following is a list of examples of types of information that may be stored in the PMF (other types of information are possible):

MPAA Ration—G, PG, PG-13, R, X, NR, etc.

Content Advisory—Explicit sexual scenes, violence, nudity, strong language, drug use, non-heterosexual encounters, etc.

Actors—A list of key actors.

Director—The program's director.

Synopsis—A description of the plot, etc.

Any other relevant information regarding the content (program).

The metadata for each program or content may be associated with the content in a number of different ways. The metadata may be associated with the content by providing a pointer to an XML file. The pointer may be, for example, an address, a file name or location, a URL, or an ID. The pointer may be embedded in the content, or may be provided separately from the content (e.g., in a table or separate file). In one embodiment, the pointer is encoded in the Vertical Blanking Interval ("VBI") of a television signal carrying the content. In another embodiment, the pointer is appended, prepended or inserted in/to the content. In yet another embodiment, the content is provided on a removable medium (e.g., CD, DVD, flash memory, floppy disk, magnetic tape, etc.) and the pointer is also stored on the medium, e.g., in a particular track, at a predetermined address, or predetermined location.

In one embodiment, in which the pointer is a URL, a content player retrieves the metadata over the Internet using the URL.

In another embodiment, the metadata is associated with the content by appending, prepending, inserting the metadata itself to/into the content. The metadata itself may be encoded in a VBI of a television signal carrying the content. The metadata may also be stored in file having a predetermined name, or may be stored at a predetermined location or address.

In connection with a Web-based content player, a PMF associated with the content may be embedded in a track of an MPEG4 file. Alternatively, a URL may be provided in a content header which the player uses to retrieve an associated PMF via HTTP or another protocol. With respect to a DVD disk, the metadata may reside on the disk, for example, in a PMF with a standard name (e.g., "program_metadata.xml"), or may be at a particular location on the disk. With respect to cable or satellite broadcast of the content, a URL, for example, may be embedded in the VBI of the broadcast. The URL may identify a location on the Internet at which the associated metadata reside, so that a settop box may retrieve the metadata.

Profile Checking: In accordance with an example embodiment of the present invention, a player or playback mechanism is provided which controls playing (e.g., rendering/displaying) of content in accordance with the Default Profile and the User Profiles. Referring now to FIG. 2, there is seen an example operation sequence for performing the control. In step 210, the user attempts to access the content (e.g., the user selects the content). In step 220, the player obtains the metadata associated with the content. Examples of possible locations of the metadata is described above. The player can obtain the metadata in a number of ways, depending, for example, on how the metadata is associated with the content. If a pointer is embedded in the VBI of a signal of the content (e.g., a television signal), the player may extract the pointer from the signal, and then retrieve (e.g., read) the metadata data using the pointer. If the pointer is a URL, the player may obtain the metadata over the Internet using the URL. As described above, a pointer may be embedded or stored in other locations. Alternatively, the metadata itself may be encoded in the VBI or in the content (including prepending, appending, embedding, etc.); or the metadata may be stored in a known location. Thus, the player may simply read the metadata.

The player then compares, in step 230, the filtering criteria in the Default Profile to the metadata to determine whether or not the content meets the criteria. For example, the player determines is the content is "safe" for all users. If the content "passes" or meets the filtering criteria, the content is played for the user.

Figure 3:
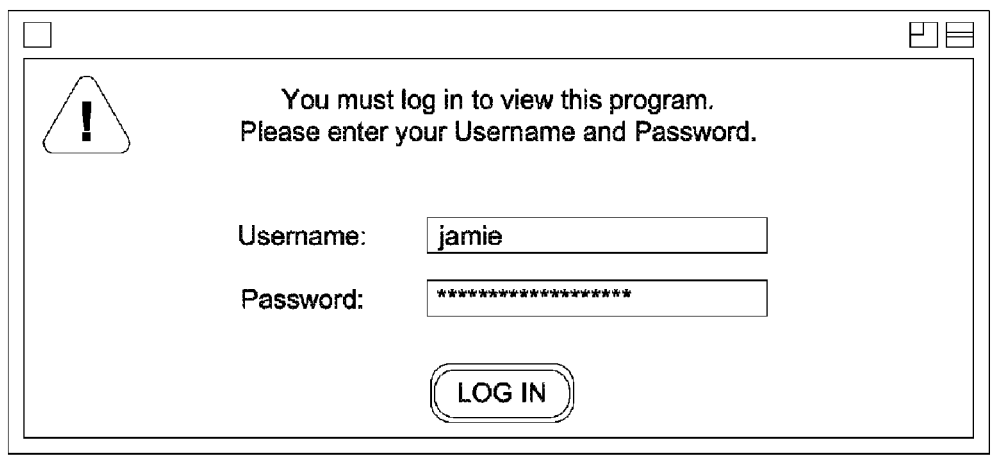
FIG. 3 is an example login screen.
Figure 4:
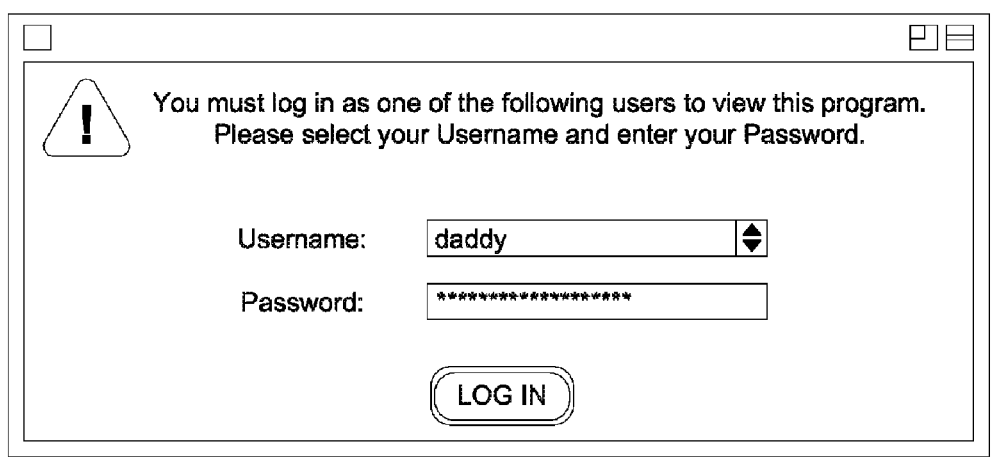
FIG. 4 is another example login screen.

If the content does not meet the filtering criteria in the Default Profile (i.e., the content fails the check), the user is alerted that a login is required to access the content (step 240). Thus, the player provides the user with screen via which the user may log. FIG. 3 shows one example screen in which the user provides a Username and Password. FIG. 4 shows another example using a pulldown menu of all users. In connection with FIG. 4, once the username is selected, the user then provides a password. If the user does not provide a valid username and password (see step 250), the player may again ask the user to log in (step 240).

If the user provides a valid username and password, the filtering criteria associated with a User Profile associated with the username and password is compared with the metadata of the content (step 260). If the content meets the filtering criteria, access to the content is permitted and the content is played (step 270). Otherwise, the user is presented with a failure message and the user is not permitted to access the content (step 280).

The player system may then automatically revert back to the Default Profile. That is, when the user attempts to access other content, the player system may again start the operations of FIG. 2, including requiring the user to log in if the content does not conform to the Default Profile. In another embodiment, the filtering criteria associated with the current User Profile remains in use for a predetermined length of time, a predetermined number of programs, etc. Thus, the same user may play consecutive programs without the need to log in again. Whether or not the system "reverts" to the Default Profile may depend on setting established by authorized users using the Account Management system.

Figure 5:
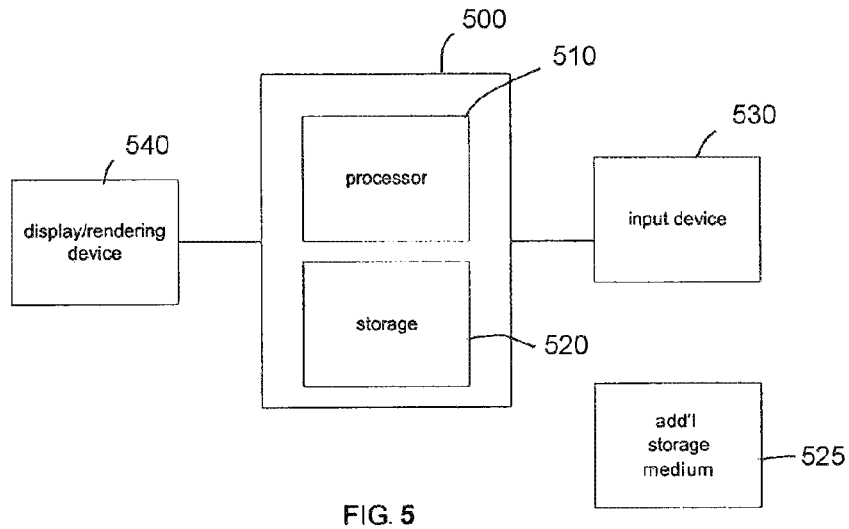
FIG. 5 is an example player system.

Example Systems: FIG. 5 shows an example player mechanism 500 in accordance with an example embodiment of the present invention. In this embodiment, the player mechanism 500 includes a processor 510 which, for example, executes the Account Management system and the profile checking system. A storage medium 520 (e.g., an internal hard disk or other non-volatile memory) locally stores, for example, Account Management information including system software, system settings, the Default Profile and User Profiles (in another embodiment, some or all of this information may be stored remotely). Content associated therewith may be stored on storage medium 520, or may be stored on an additional storage medium 525. The additional storage medium 525 may be a removable medium such as a CD, DVD, flash memory (e.g., a memory stick), magnetic tape, etc. Alternatively, the medium may be a fixed medium such as an internal hard disk. A pointer to the metadata associated with the content and/or the metadata itself may be available as discussed above.

The player mechanism also includes an input device 530 for allowing user input. The input device 530 may include a keyboard, mouse, trackball or any other type of input device.

The player mechanism also includes a display/rendering device 540. In one embodiment, the display/rendering device includes a video output and/or an audio output for displaying/rendering permitted content.

Figure 6:
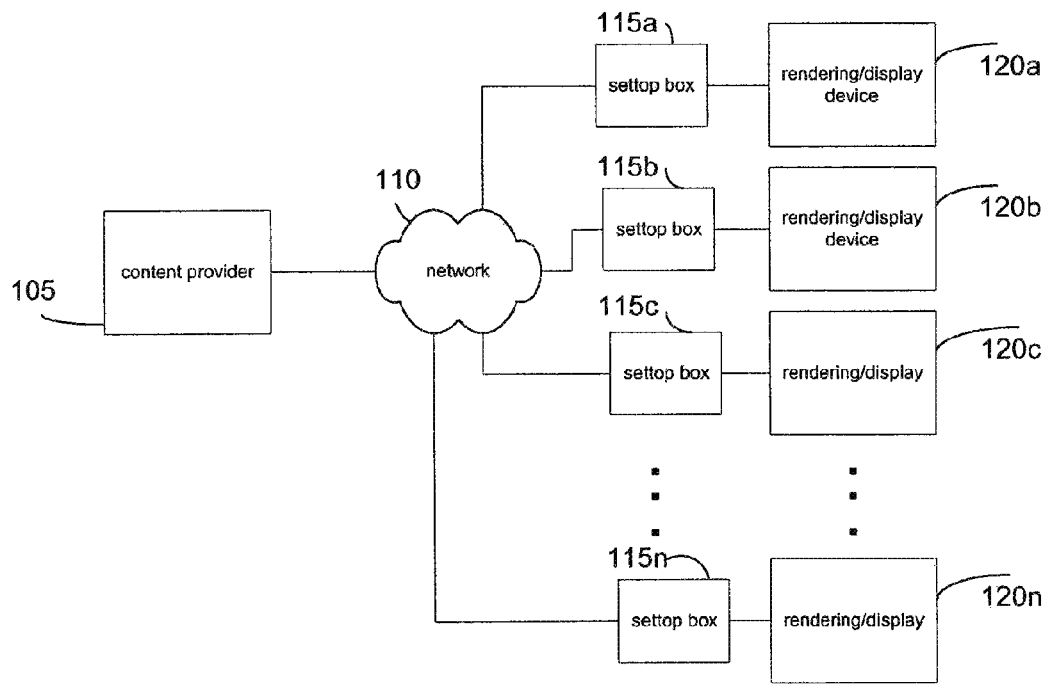
FIG. 6 is another example player system.

FIG. 6 shows an example system in accordance with another embodiment of the present invention. In this example, a content provider 105 is connected to settop boxes 115a-115n via a network 110. The content may include, for example, a television station, an Internet provider, a cable broadcast system, a satellite broadcast system. The network 110 may be a wired or wireless network, and make include a cable television network, satellite television network, a video-on-demand (VOD) network, a pay-per-view (PPV) network, and/or a Web-based network. Alternatively, the content provider 105 may provide broadcast, multicast or pointcast programming which a user can receive via an antenna. The settop boxes 115a-115n are coupled to rendering/display devices 120a-120n such as televisions. In this embodiment, the Account Management system and profile checking system may reside in the settop box. The settop box may include, for example, a processor and storage devices such as those described above in connection with FIG. 5. The content provider 105 provides content to each user via the settop boxes 115a-115n.

What is claimed is:

1. A method to control access to content via a player system accessible by a plurality of users, the method comprising:
   providing a default profile including at least one filtering criterion, the filtering criterion describing at least one of a characteristic of content permitted for all of the plurality of users and characteristic of content prohibited for all of the plurality of users;
   comparing metadata associated with a selected content and the filtering criterion of the default profile, the metadata including information related to the selected content;
   permitting or denying access to the content based on the comparison with the filtering criterion of the default profile;

providing a user profile associated with a particular one of the plurality of the users, the user profile including at least one filtering criterion describing at least one of a characteristic of content permitted to be accessed by the particular one of the users and a characteristic of content prohibited from being accessed by the particular one of the users;

comparing the filtering criterion of the user profile and the metadata;

permitting access to the selected content if the content meets the filtering criterion of the user profile; and reverting back to the filtering criterion of the default profile in connection with accessing subsequent content responsive to at least one of: passage of a predetermined length of time; a predetermined number of content being accessed; an attempt to access content prohibited by the user profile; and viewing of content accessed in accordance with the user profile.

2. The method according to claim 1, wherein the access to the selected content is permitted if the comparison indicates that the selected content meets the filtering criterion of the default profile.

3. The method according to claim 1, wherein the content includes at least one of audio and video data.

4. The method according to claim 1, wherein the information of the metadata includes at least one of an MPAA rating, a content advisory, a name of an actor associated with the selected content, a name of a director of the selected content, a genre and a synopsis.

5. The method according to claim 1, wherein the filtering criterion includes at least one of identification of acceptable ratings, identification of acceptable content advisories, identification of prohibited synopsis information, identification of prohibited directors, identification of prohibited actors, and identification of prohibited genres.

6. The method according to claim 1, wherein the metadata is coded in XML.

7. The method according to claim 1, further comprising: providing the selected content on a removable medium.

8. The method according to claim 7, wherein the medium includes at least one of a CD, DVD, magnetic tape, and flash memory.

9. The method according to claim 1, wherein:
a URL used in connection with the selected content, associates the metadata with the selected content; and
the method further comprises obtaining the metadata using the URL.

10. The method according to claim 1, wherein:
a pointer to the metadata is encoded in a Vertical Blanking Interval of a signal of the selected content; and
the method further comprises obtaining the metadata using the pointer.

11. The method according to claim 10, wherein the pointer is a URL.

12. The method according to claim 1, further comprising:
providing a user profile associated with a particular one of the plurality of the users, the user profile including at least one filtering criterion describing at least one of a characteristic of content permitted to be accessed by the particular one of the users and a characteristic of content prohibited from being accessed by the particular one of the users;
comparing the filtering criterion of the user profile and the metadata; and
permitting access to the selected content if the content meets the filtering criterion.

13. The method according to claim 12, further comprising:
requiring the user to provide user information if the selected content does not meet the filtering criterion of the default profile.

14. The method according to claim 13, wherein the user information includes a username and a password, the user profile being associated with the username.

15. The method according to claim 1, wherein the comparing step includes comparing the metadata and the filtering criterion of the default profile without requiring a user to provide user information.

16. The method according to claim 1, wherein the selected content includes metadata linked thereto via a pointer, the method further comprising:
obtaining the metadata using the pointer.

17. The method according to claim 16, wherein the pointer is embedded in a Vertical Blanking Interval (VBI) of a signal of the selected content, and wherein the method further comprises:
extracting the pointer from the VBI.

18. The method according to claim 16, wherein the pointer is a URL, and the step of obtaining the metadata of the selected content includes obtaining the metadata over the Internet using the URL.

19. The method according to claim 1, wherein the selected content is stored on a memory device, the method further comprising:
reading metadata associated with the content.

20. The method according to claim 19, wherein the metadata includes ratings information.

21. The method according to claim 1, wherein
the filtering criterion further includes a description of a characteristic of content for use as an exception to the characteristic of prohibited content.

22. The method according to claim 1, wherein the at least one filtering criterion includes a plurality of filtering criteria, a first one of the plurality of filtering criteria overriding a second one of the plurality of filtering criteria.

23. The method according to claim 1, further comprising:
displaying a user interface having fields for logging into the user profile in response to an attempt to access content prohibited according to the default profile.

24. A content player accessible to a plurality of users, comprising:
a memory device storing a default profile and a user profile associated with a particular one of the plurality of users, the default profile and the user profile including at least one filtering criterion, the filtering criterion of the default profile describing at least one of a characteristic of content permitted for all of the plurality of users and a characteristic of content prohibited for all of the plurality of users, the filtering criterion of the user profile describing at least one of a characteristic of content permitted to be accessed by the particular one of the users and a characteristic of content prohibited from being accessed by the particular one of the users; and
a processor configured to compare metadata associated with selected content and at least one of the filtering criterion of the default profile and the filtering criterion of the user profile, the processor configured to permit or deny rendering of the selected content based on the comparison, the processor configured to, subsequent to the comparison with the filtering criterion of the user profile, revert back to the filtering criterion of the default profile in connection with rendering subsequent content responsive to at least one of: passage of a predetermined length of time; a predetermined number of content being accessed; an attempt to access content prohibited by the user profile; and viewing of content accessed in accordance with the user profile.

25. The content player according to claim 24, wherein the selected content is provided on a removable media.

26. The content player according to claim 24, wherein a pointer to the metadata is associated with the selected content, and wherein the processor is configured to obtain the metadata for the comparison using the pointer.

27. The content player according to claim 26, wherein the pointer is a URL.

28. The content player according to claim 24, wherein the processor is provided in a settop box, and wherein the processor controls rendering of the content on a television.

29. The content player according to claim 28, wherein the processor is configured to obtain a pointer to the metadata, the pointer being encoded in a vertical blanking interval of a signal of the selected content; and wherein the processor obtains the metadata for the comparison using the pointer.

30. The content player according to claim 29, wherein the pointer is a URL.

31. The content player according to claim 24, wherein the processor is configured to manage the default profile and a plurality of user profiles, each of the user profiles being associated with a respective one of the users.

32. The content player according to claim 24, wherein the filtering criterion includes at least one of identification of acceptable ratings, identification of acceptable content advisories, identification of prohibited synopsis information, identification of prohibited directors, identification of prohibited actors, and identification of prohibited genres.

33. The content player according to claim 24, wherein the metadata is coded in XML.

34. The content player according to claim 24, wherein the processor is configured to obtain a pointer to metadata associated with selected content, and to obtain the metadata using the pointer.

35. The content player according to claim 34, wherein the pointer is a URL, and the processor is further configured to obtain the metadata over the Internet using the URL.

36. The content player according to claim 34, wherein the processor is configured to extract the pointer from a vertical blanking interval (VBI) of a signal of the selected content.

37. The content player according to claim 24, wherein the processor is provided in one of a computer, a settop box, and a Web-based content player.

\* \* \* \* \*